United States Patent [19]

Oyama

[11] Patent Number: 4,557,070
[45] Date of Patent: Dec. 10, 1985

[54] PLANT POT WITH MOISTURIZING AND AERATION MEANS

[76] Inventor: George C. Oyama, 2190 Broadway St., Apt. 3E, San Francisco, Calif. 94115

[21] Appl. No.: 546,490

[22] Filed: Oct. 28, 1983

Related U.S. Application Data

[63] Continuation-in-part of Ser. No. 401,066, Jul. 23, 1982, abandoned.

[51] Int. Cl.⁴ ............................................. A01G 25/00
[52] U.S. Cl. ...................................................... 47/80
[58] Field of Search .............. 47/66, 71, 73, 77, 79–81

[56] References Cited

U.S. PATENT DOCUMENTS

| | | | |
|---|---|---|---|
| 135,271 | 1/1873 | Gould | 47/80 |
| 320,588 | 6/1885 | Rhoads | 47/81 |
| 661,411 | 11/1900 | Lonitz | 47/79 |
| 1,391,353 | 9/1921 | Wells | 47/71 |
| 1,533,342 | 4/1925 | Schein | 47/71 |
| 1,778,150 | 10/1930 | Freeburg | 47/80 |
| 2,057,972 | 10/1936 | Pieck | 47/34 |
| 2,154,269 | 7/1950 | Wilberschied | 47/81 |
| 2,344,202 | 3/1944 | Carlson | 47/80 |
| 2,387,340 | 10/1945 | Moriarty | 47/38 |
| 2,486,932 | 11/1949 | Elliott | 47/41 |
| 2,810,234 | 10/1957 | Blackburn et al. | 47/66 |
| 2,854,790 | 10/1958 | Hartung | 47/66 |
| 2,865,137 | 12/1958 | Longacre | 47/38 |
| 3,199,250 | 8/1965 | Sawyer | 47/81 |
| 3,552,058 | 1/1971 | Fici | 47/79 |
| 3,800,469 | 4/1974 | Lau et al. | 47/66 |
| 3,961,443 | 6/1976 | Insalaco | 47/66 |
| 3,965,561 | 6/1976 | Kienbolz | 47/14 |
| 3,965,616 | 6/1976 | Ridgeway | 47/66 |
| 4,062,147 | 12/1977 | Phillips | 47/71 |
| 4,077,159 | 3/1978 | Haglund | 47/66 |
| 4,092,804 | 6/1978 | Morris et al. | 47/66 |
| 4,106,235 | 8/1978 | Smith | 47/59 |
| 4,145,841 | 3/1979 | Wollpert | 47/66 |
| 4,160,342 | 7/1979 | Dryer | 47/80 |
| 4,173,097 | 11/1979 | Staby | 47/66 |
| 4,198,784 | 4/1980 | Sukert | 47/79 |
| 4,216,623 | 8/1980 | Silver | 47/80 |
| 4,224,764 | 9/1980 | Dziewulski et al. | 47/71 |
| 4,245,434 | 1/1981 | Green | 47/80 |
| 4,329,815 | 5/1982 | Secrest | 47/80 |

FOREIGN PATENT DOCUMENTS

| | | | |
|---|---|---|---|
| 1168485 | 12/1958 | France | 47/79 |
| 863177 | 3/1961 | United Kingdom | 47/81 |

*Primary Examiner*—James R. Feyrer
*Attorney, Agent, or Firm*—James R. Cypher

[57] ABSTRACT

An inner plant pot for holding a living plant, soil and hydrophilic inert material and supported within an outer container. Openings in the bottom and side of the plant pot provide passages for water and air to a large area of the roots of the plant.

The inner and outer containers are dimensioned to provide minimal water storage. Water is forced into the inner container through openings and the water is retained by the inert material and the soil.

7 Claims, 16 Drawing Figures

PLANT POT WITH MOISTURIZING AND AERATION MEANS

This application is a continuation-in-part of my co-pending application, Ser. No. 06/401,066 for PLANT POT WITH MOISURIZING AND AERATION MEANS, filed July 23, 1982; now abandoned.

BACKGROUND OF THE INVENTION

Growing plants indoors in pots is a rapidly increasing pastime for thousands of people. Early plant pots, and they still constitute the majority, simply consist of a pot to hold the soil, a drain hole in the bottom and a saucer to catch the excess water poured in from the top.

Early attempts to replace the standard clay pot resulted in providing large reservoirs of water which continuously supplied water for several days. Several recent pots follow this teaching. These reservoir pots have relatively small volumes of soil to total pot volume ratios. Examples are as follows:

| U.S. PAT. NO. | GRANTED: | INVENTOR: |
|---|---|---|
| 135,271 | Jan. 28, 1973 | M. B. Gould |
| 2,344,202 | March 14, 1944 | E. Carlson |
| 3,552,058 | Jan. 5, 1971 | J. C. Fici |
| 4,160,342 | July 10, 1979 | G. M. Dryer |
| 4,198,784 | April 22, 1980 | H. L. Sokert |
| 4,216,623 | August 12, 1980 | S. M. Silver |

Since over watering is a common problem, a wide variety of patented containers were created. Examples of draining pots are set forth below:

| U.S. PAT. NO. | GRANTED: | INVENTOR: |
|---|---|---|
| 1,391,353 | Sept. 20, 1921 | R. D. Wells |
| 2,057,972 | Oct. 20, 1936 | C. E. Pieck |
| 2,486,932 | Nov. 1, 1949 | F. S. Elliott |
| 4,092,804 | June 6, 1978 | D. A. Morris, et al |
| 4,145,841 | March 27, 1979 | J. C. Woolpert |
| 4,224,764 | Sept. 30, 1980 | T. Dziewulski, et al |

The need for aeration of the root system was recognized and provided by the following patents: Phillips, U.S. Pat. No. 4,062,147, 1977 and Staby U.S. Pat. No. 4,173,097, 1979.

The most common practice of storing water and then supplying water to the roots is by humidified pots. Examples are as follows:

| U.S. PAT. NO. | GRANTED: | INVENTOR: |
|---|---|---|
| 661,411 | Nov. 6, 1900 | Lonitz |
| 1,533,342 | April 14, 1925 | Schein |
| 1,778,150 | Oct. 1930 | Freeburg |
| 2,387,340 | Oct. 23, 1945 | Moriarty |
| 3,965,614 | Nov. 28, 1975 | Kienholz |
| 4,077,159 | March 7, 1978 | Haglund |
| French Patent: | | |
| 1,168,485 | Dec. 9, 1958 | Ferrand |

Another humidified pot is Smith, U.S. Pat. No. 4,106,235 with soil completely filling the pot and holes in the bottom so the roots grow into and are immersed in the reservoir water.

The humidified pots unfortunately do not provide enough moisture to the roots to sustain the plants and some inventors have provided wicks to transport the water from the reservoir to the soil surrounding the roots. Examples are U.S. Pat. No. 320,588, Rhoads and British No. 863,177, Mar. 15, 1961, Szekely.

An unusual method of storing water in an adsorbent material outside the inner pot and feeding it slowly through slots in the inner pot is taught by C. F. Wilberscied, July 4, 1950, U.S. Pat. No. 2,514,269.

Still another method of introducing water to the root system from a reservoir is taught by U.S. Pat. No. 2,865,137, Longacre, Dec. 23, 1958. A "capillary" method is used in which a small tube filled with rock wood extends into the water reservoir. An opening in the bottom of the tube permits water to enter at the bottom of the tube and rise up through the rock wool to a small opening in the bottom of an elevated pot.

Recently, self controlled watering planter devices have been disclosed, such as U.S. Pat. No. 4,329,815, Secrest.

None of the prior art patents, however, disclose a planter with a water reservoir which initially provides the correct amount of water to a relatively large root zone area for a relatively long length of time and then serves as a drain to remove excess water.

SUMMARY OF THE INVENTION

The present invention discloses a plant pot which stores a relatively large quantity of water in an adsorbing material in the inner pot and not only waters the roots in a relatively large root zone area but aerates them as well. An indicator system prevents over-watering and automatic drainage is provided.

The present plant pot provides a large soil and perlite volume to total volume ratio thus reducing the need for bulky pots normally associated with plant watering systems.

The interval between watering, such as an African violet can be extended from two to three days to on the average once every two weeks.

The device consists of an outer pot which initially receives a supply of water and also provides support for the inner pot which holds the soil and perlite and then receives any drainage water. The inner container is formed with openings in the bottom and lower portions of the sidewall to permit passage of water and air to the roots of the plant. Distribution of the openings throughout the entire bottom wall and a large portion of the sidewall insures distribution of air and water to essentially all portions of the root structure.

An indexing system is provided so that filling to an indexing mark will prevent over-watering. The volumes of the inner and outer containers are carefully selected to prevent overflowing or excess water in the inner container when watering instructions are followed.

The purpose of the present system is to provide a system for watering, draining, and aerating plants so that steady healthy growth will be assured with longer interval between watering.

A further purpose of the device is to provide a way of adding nutrients and pesticides to the plant roots without leaching away soil and existing nutrients and pesticides.

DESCRIPTION OF THE PREFERRED EMBODIMENTS OF THE INVENTION

Figure 1:
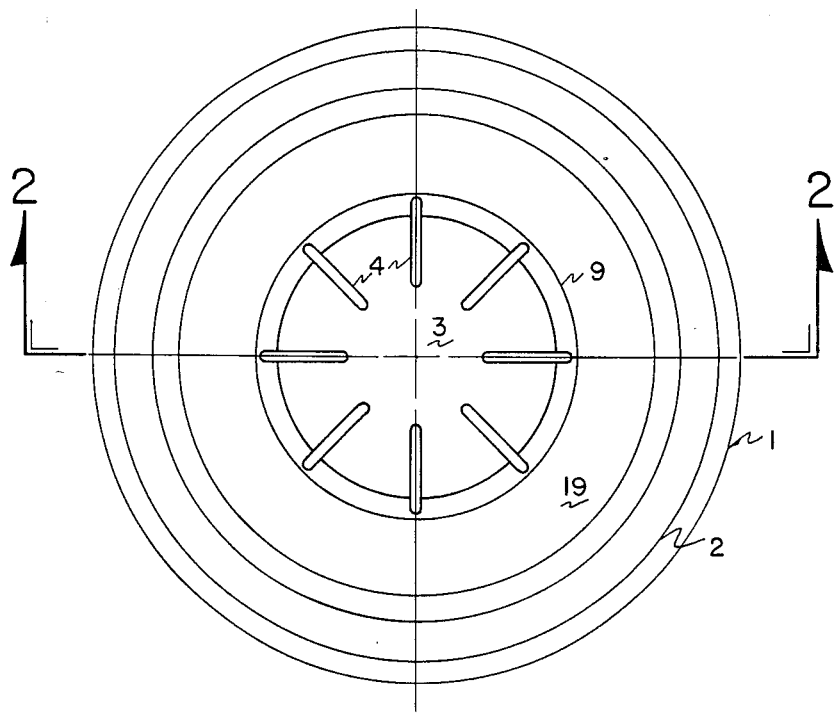
FIG. 1 is a top plan view of the inner and outer containers.

The plant pot of the present invention for holding a living plant and soil consists briefly of an open topped plant container 1 having sidewalls 2 for containing the plant and soil and a bottom wall 3 formed with openings 4 generally distributed over substantially the entire bottom wall permitting the free passage of air and water. Openings 6 are formed in the sidewall of the plant container and are distributed generally uniformly around substantially the entire lower portion of the sidewall to a preselected height. A reservoir container 7 having an open top is adapted for supporting and enveloping the lower portion of the plant container. Means are formed either in the upper portion of the reservoir or the wall of the plant container permitting the exchange of air to and from the lower portion of the plant container. A quantity of non-soil filler material 8 fills the bottom portion of the plant container to a preselected level permitting the passage of water and generally supporting and preventing the passage of soil material. The openings 6 in the sidewall of the plant container are below the preselected fill level line 9 of the non-soil material and substantially above the bottom wall of the plant container.

Various types of non-soil fill material could be used but the preferred material is expanded perlite. The filler should be inert, light, hydrophilic, porous, inert, inorganic and adsorb and hold water.

One purpose of the present plant pot is to take the trial and error out of growing healthy plants. For this reason, not only the fill level for the perlite is formed in the plant pot, but also an indicia mark 11 is formed in the reservoir container indicating a pre-selected water level; below which, filling will not result in overflow.

The plant container is formed with an annular inwardly directed shoulder 12. The reservoir container is formed with a rim 13 dimensioned for registration with the shoulder of the plant container. The rim 13 may be formed with openings such as channel shaped openings 14 for the free passage of air, but preferably shoulder 12 is formed with bridges 14 which rest on rim 13 and raise the plant container sufficiently to permit air to enter the space between the wall 32 of the reservoir container and wall 19 of the plant pot.

Figure 5:
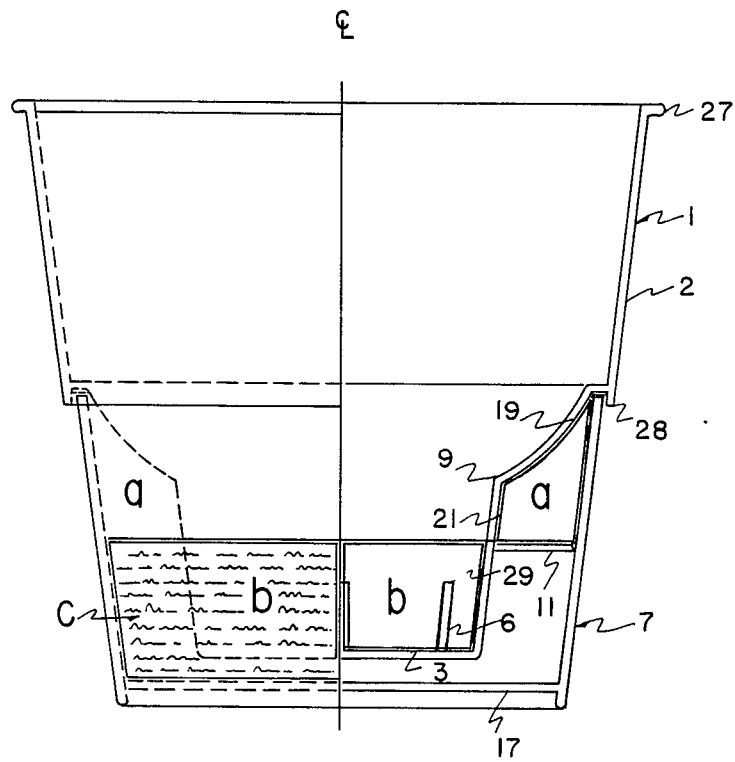
FIG. 5 is a schematic cross section similar to FIG. 2. The portion to the left of the center line is filled with water to an index line as shown. The cubic volume of the annular space designated "a" is greater than the cubic volume of the annular space designated "b". Thus when the inner container is lowered into the outer container, the water designated C will not flow over the top rim of the outer container.
Figure 6:
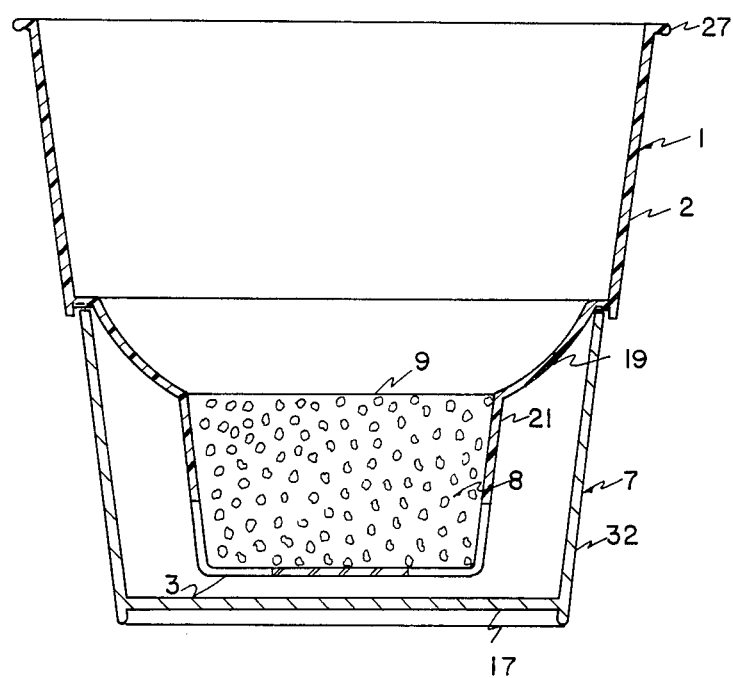
FIG. 6 is a cross sectional view similar to FIGS. 2 and 5 showing the inner container filled to the prescribed level with perlite material.

Referring to FIG. 5, the plant container is dimensioned so that the cubic volume of the plant container below the annular line 11 and indicated by the letter "b" is less than the volume of the annular space between the reservoir container and the seated plant container above the indicia mark 11 and indicated by the letter "a". This careful dimensioning prevents overfilling of the reservoir container and the spilling of water during the filling operation.

The water level, of course begins to drop as soon as the plant container is placed in the reservoir through adsorption of the water in the perlite and soil as well as by the withdrawal of water by the plant roots and evaporation of water from the soil. The capacity of the reservoir container is designed so that when the plant grower first determines that the soil in the top of the plant container is too dry there will still be some water remaining in the reservoir. The bottom wall of the plant container is located so that it will be above the level of the water in the reservoir for a period of a few days before water is once again added to the water fill line level.

A portion 19 of the sidewall of the plant container below the annular shoulder 12 and above the preselected fill line 9 for the non-soil material slopes inwardly providing self registering of the plant container with the reservoir container. As shown in the drawings, this sloping portion may take a concave shape. A lower portion 21 of the sidewall of the plant container below the pre-selected fill line 9 for the non-soil material is generally vertical; sloping only a sufficient amount for molding purposes. One purpose of the differing slopes in the sidewalls of the plant container is to indicate visually the pre-selected fill level 9 for the non-soil material.

Shoulder 12 in the plant container 1 is located with respect to the bottom wall 3 of the plant container so that when the plant container is seated in registration with the reservoir container, the bottom wall of the plant container is located in adjacent, spaced relation to the bottom wall 17 of the reservoir container. The bottom wall of the plant container, of course, should not contact the top wall 18 or the indent 16. Thus, the plant container is preferably supported on the rim 13 of the reservoir container.

Figure 7:
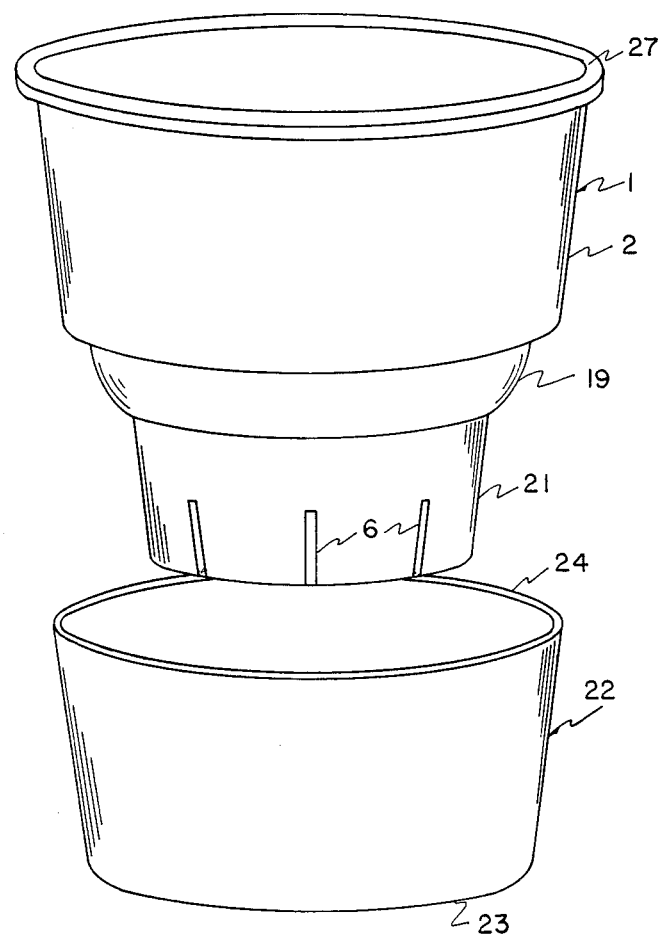
FIG. 7 is a perspective view of a modified form of the invention in which the plant container is identical to the plant container shown in the previous figures, in combination with an open ended sleeve.
Figure 8:
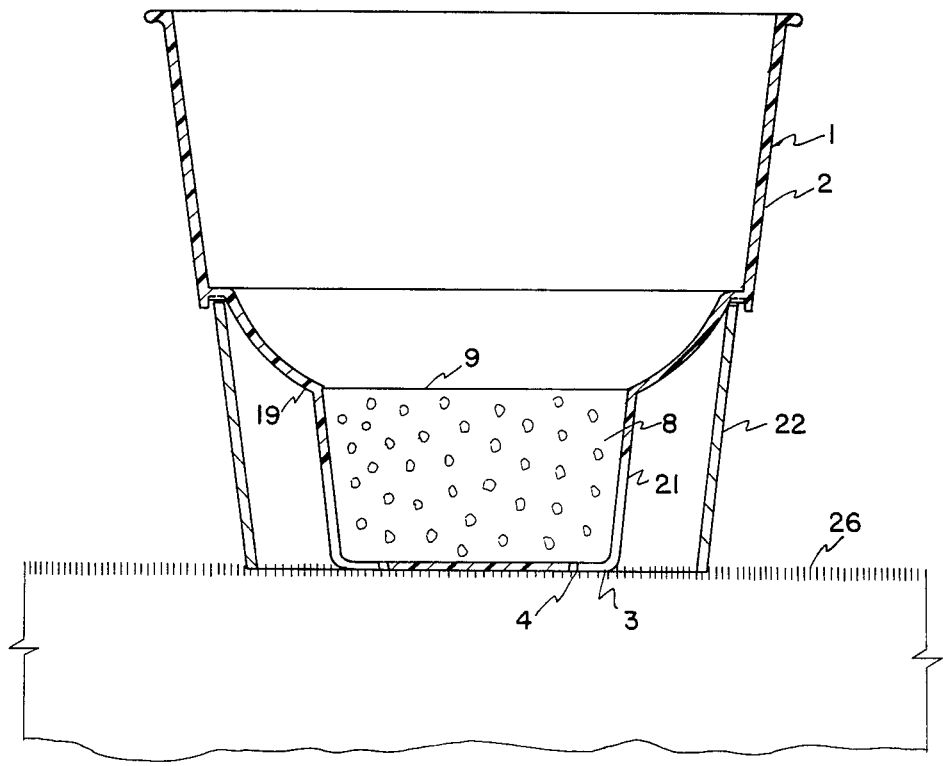
FIG. 8 is a cross sectional view of the modified form of the invention shown in FIG. 7 positioned on a growing mat as used by professional and advanced amateur plant growers.
Figure 9:
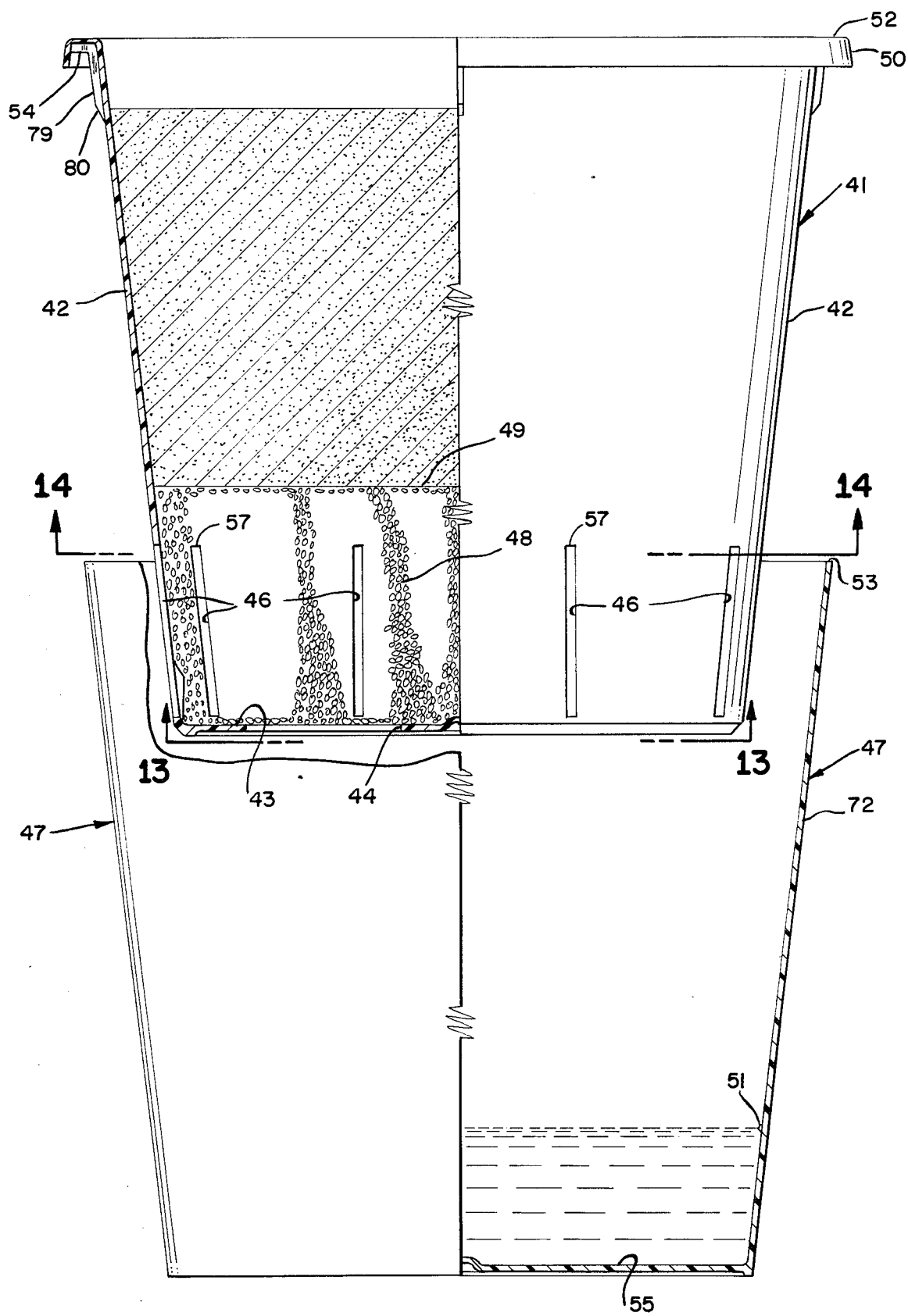
FIG. 9 is an exploded view of a second embodiment partially in elevation view and partially in cross section with portions cut away for clarity.

FIGS. 7 and 8 illustrate a modified form of the invention. The purpose of the modified form is to enable professional and advanced amateur plant growers to grow a large number of plants on a large table or bed and to water the plants without having to remove the plant container from the bed. Such a system also enables the plant grower to grow the plants in the same container in which the mature plant will be sold to the retail customer. This system eliminates the re-potting of plants which is a time consuming and expensive operation. Elimination of the re-potting step also eliminates the plant traumatizing which occurs, thereby resulting in a healthier plant and a lower percentage of plant loss due to handling.

Specifically, the plant container is identical to the plant container previously described and like parts carry the same identifying numbers. The reservoir container, however, is replaced by a simple truncated cone 22. The height of the sidewall of the cone 22 is dimensioned so that the bottom wall 3 of the plant container is about the same elevation as the bottom edge 23 of the cone when the plant container is seated in registration with the top wall 24 of the cone.

As shown in FIG. 8, the cone and plant container rest on a growing mat 26 which is in touching contact with the bottom wall 3 of the plant container. Thus, by simply soaking the mat 26, all of the plants in plant containers and on support cones placed on the mat will be watered simultaneously without removing the plant containers from the cones.

The plant container 1 is dimensioned so that it suitably holds a particular species of a plant. The rim 27 of the plant pot is formed with a wide flange which is formed without sharp edges. This is important for plants such as violets which have tender plant stems and could be damaged by contact with the sharp edges of an incorrectly formed plant pot rim.

The sidewalls of the plant pot are preferably formed with a depending lip 28 which extends below shoulder 12 and rim 13. This gives a more pleasing appearance by masking the bridges 14 in the shoulder of the plant container. The lip also ensures that the plant container is properly seated on the rim of the reservoir container. The bottom wall 3 of the plant container is preferably flat. Openings 4 in the bottom wall may be of any shape, and size is dependent primarily on the size of the non-soil material to be contained. The most inexpensive form of opening is an elongated slot, radiating from a central portion of the bottom wall.

Figure 2:
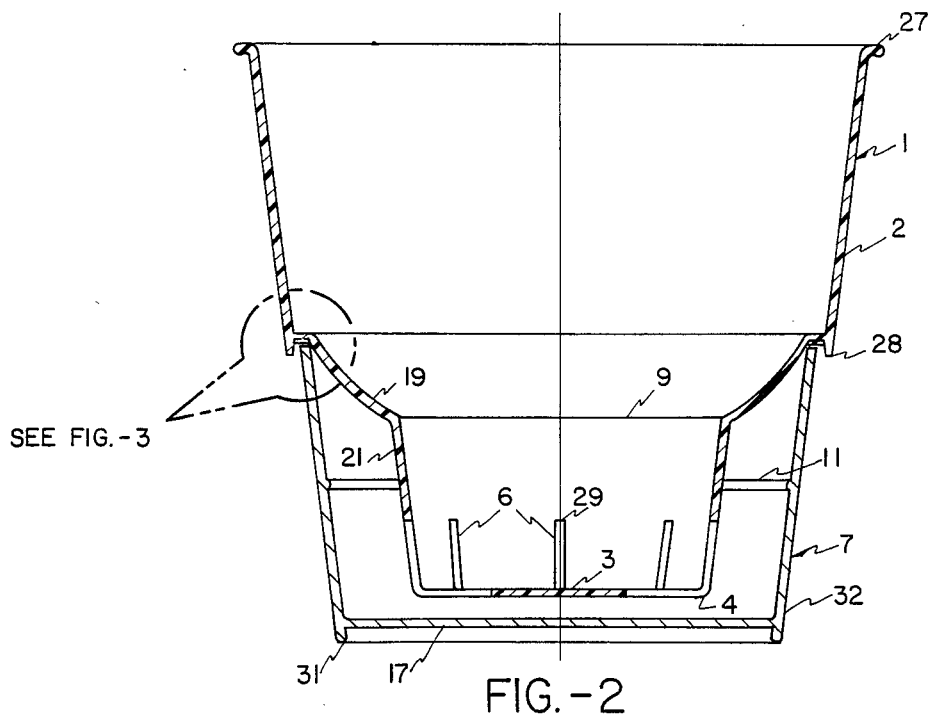
FIG. 2 is a cross section of the plant pot taken along line 2—2 of FIG. 1.
Figure 3:
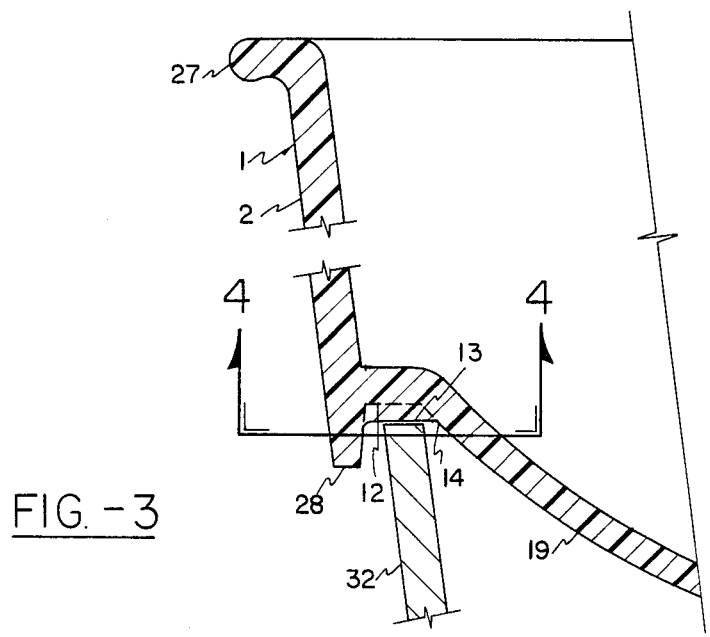
FIG. 3 is an enlarged cross sectional portion of the plant pot taken generally along line 3 of FIG. 2.
Figure 4:
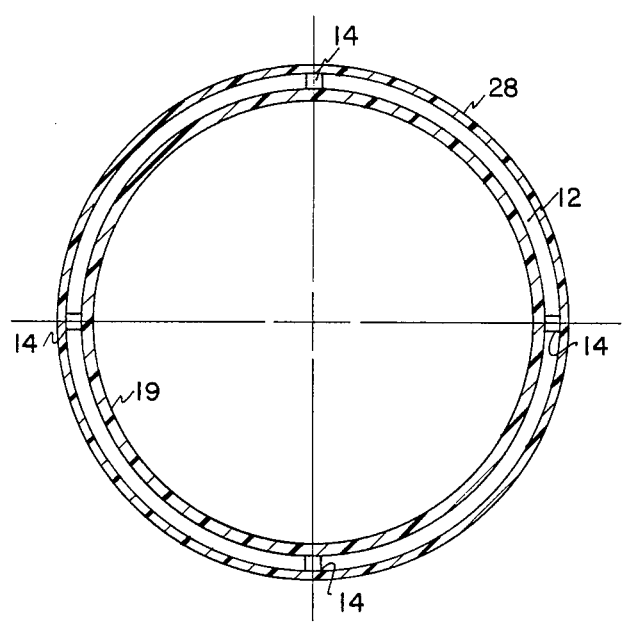
FIG. 4 is a cross sectional view of the annular portion of the pots taken along line 4—4 of FIG. 3.

The openings 6 as shown in FIG. 2 are preferably slits which extend up a preselected distance in the sidewall. The upper ends 29 of slits 6 should be located below the level of the soil and slightly below the upper level of water when the reservoir container is initially filled. The tops of the slits should be above water line within a short time so that air may pass through the slots 6 and the perlite material to the roots during a substantial portion of the growing time of the plant.

The reservoir container 7 is preferably formed with a depending leg 31 so that the reservoir bottom wall 17 will not rest on the supporting surface such as a table top thereby resulting in an unstable condition. The sidewalls 32 of the reservoir container are preferably tapered for appearance and for ease of manufacture. Tapering the sidewall also enables the reservoir containers to be nested and stored in a small space for storage and shipping.

OPERATION OF THE PREFERRED FORM OF THE INVENTION

Perlite or other inert non-soil material should first be placed in the container to a depth indicated by the fill line 9. Soil and the plant should then be placed in the container. Since all watering is from below, the soil may be placed quite close to the top rim 27 of the container. Normally the soil would have to be well below the rim of the container to permit a quantity of water to be poured into the top of the container without spillage while the water percolated down into the soil. The initial watering may be done from above, depending on the needs of the particular plant and then soil filled to nearly the top of the container.

Water is then poured into the reservoir container to the indexing mark 11. Finally, the plant container is set into the reservoir container.

Initially, the water level will be above the top ends 29 of the openings 6, but the perlite quickly adsorbs a portion of the water and water begins to work its way up into the soil of the container by the normal manner in which water rises in dry soil. Since the openings are distributed over the entire bottom 3 and the openings 6 extend up the sidewalls, the water quickly enters the perlite and soil and creates a substantial moistened zone in the soil into which the roots penetrate. This large moistened zone, provides moisture throughout the entire plant pot rather than in just a small area so that the roots will spread evenly throughout the plant pot rather than growing toward a small moist zone. The perlite adsorbs the water quickly and the water level drops below the bottom wall of the plant container within a few days.

The reservoir container must be replenished with water periodically and the time period will depend upon the size and type of plant, humidity of the atmosphere in which the plant is growing, amount of direct sunlight which reaches the plant and the environment temperature. The plant and moisture in the soil should be checked frequently until a time period is established for refilling the reservoir. Refilling is determined by touching the soil and determining whether the soil has a moist or dry feel. Water should not be added too frequently. The water should be permitted to drain and the water level permitted to remain below the bottom wall of the plant container for a few days.

OPERATION OF THE MODIFIED FORM OF THE INVENTION

In FIGS. 7 and 8, the plant, soil and perlite are inserted into the plant container in the same manner as above described. Instead of inserting the plant container in the reservoir container, the plant container is placed on the support cone 22. Water is poured into the growing carpet or mat 26 of the level of the index level 11 of the reservoir container.

When the plant has reached the maturity required for sale, the plant container is simply lifted off the cone or mat and shipped without repotting.

Where the bottom wall 3 of the plant container forms a broad base, the cone 22 is not necessary and the plant container may stand unsupported on the mat 26.

A smaller cone may also be provided which supports the plant container at line 9 on the plant container.

Another form of the plant pot of the present invention for holding a living plant and soil as shown in FIGS. 9-16 consists briefly of an open topped inner plant container 41 having sidewalls 42 for containing the plant and soil and a bottom wall 43 formed with openings 44 generally distributed over substantially the entire bottom wall permitting the free passage of air and water. Openings 46 are formed in the sidewall of the inner plant container and are distributed generally uniformly around substantially the entire lower portion of the sidewall to a preselected height. An outer container 47 having an open top is adapted for supporting and enveloping substantially the entire inner plant container. Means are formed either in the upper portion of the outer container or the wall of the inner plant container permitting the exchange of air to and from the lower portion of the inner plant container. A quantity of non-soil filler material such as perlite 48 fills the bottom portion of the plant container to a preselected level permitting the passage of water and generally supporting and preventing the passage of soil material. The openings 46 in the sidewall of the inner plant container are below the preselected fill level line 49 of the non-soil material and substantially above the bottom wall of the inner plant container.

Various types of non-soil fill material could be used but the preferred material is expanded perlite. The filler should be inert, light, hydrophilic, porous, inert, inorganic and adsorb and hold water.

One purpose of the present plant pot is to take the trial and error out of growing healthy plants. For this reason, not only the fill level for the perlite is formed in the inner plant pot, but also an indicia mark 51 is formed in the reservoir container indicating a preselected water level; below which, filling will not result in overflow or excess watering.

Figure 10:
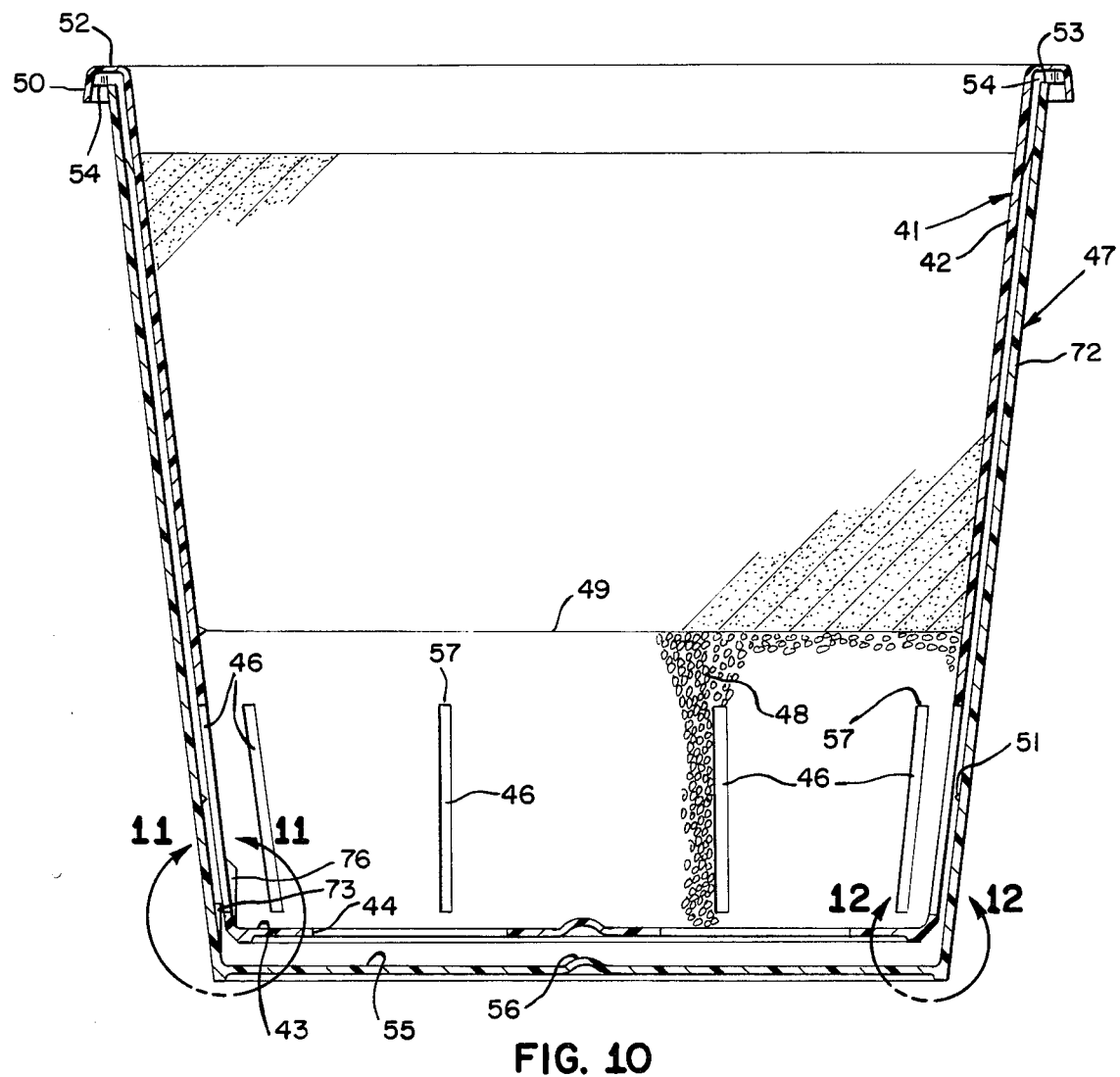
FIG. 10 is a cross sectional view of the plant pot shown in FIG. 9 with the inner and outer pot placed in the normal position with respect to each other.
Figure 11:
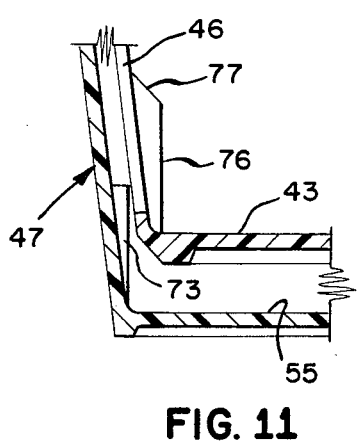
FIG. 11 is an enlarged scale portion of the device of FIG. 10 taken generally along lines 11—11.
Figure 12:
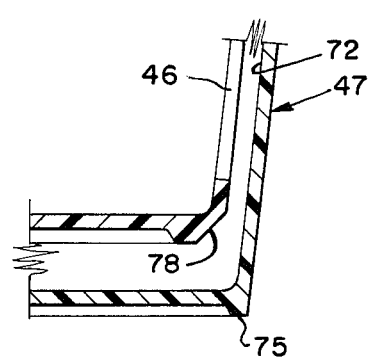
FIG. 12 is an enlarged scale portion of the device of FIG. 10 taken generally along lines 12—12.
Figure 14:
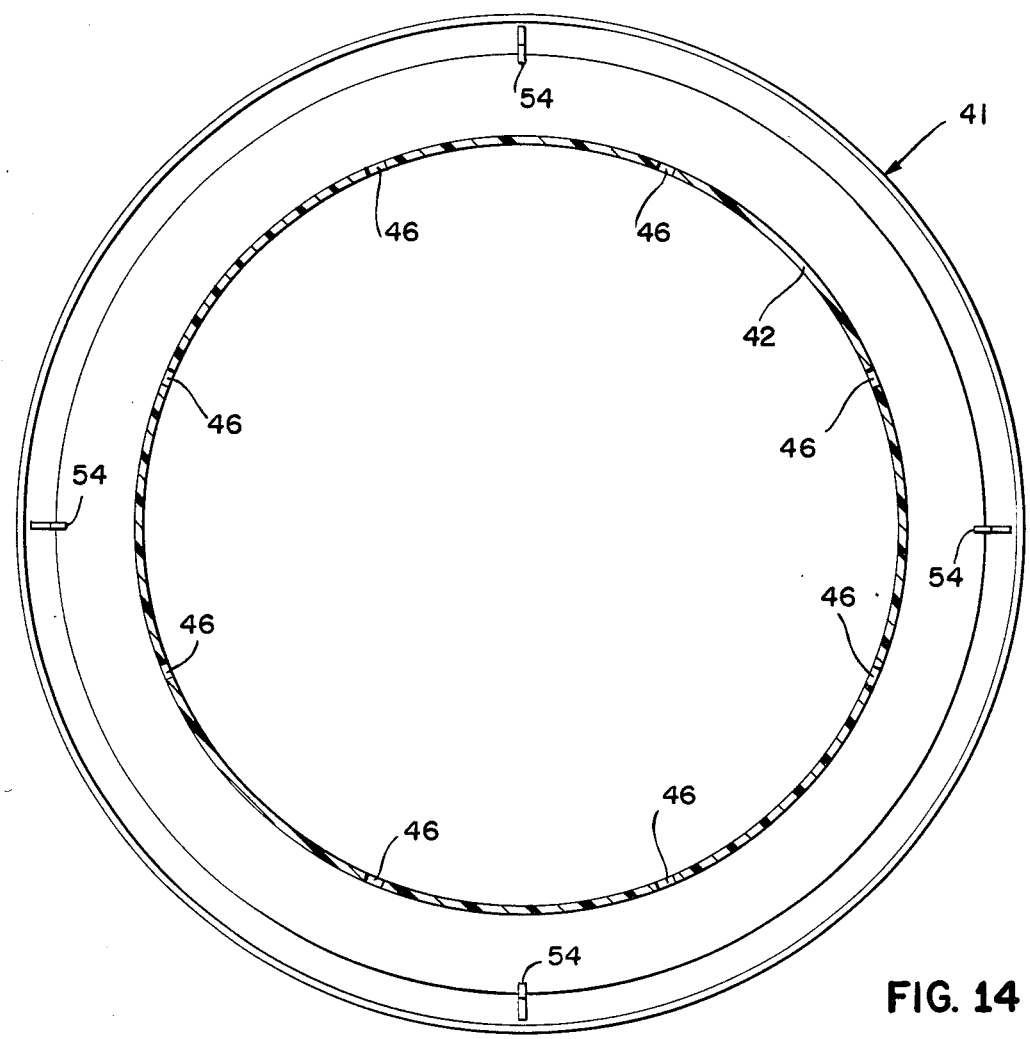
FIG. 14 is a cross section of the device taken along line 14—14 of FIG. 9.
Figure 13:
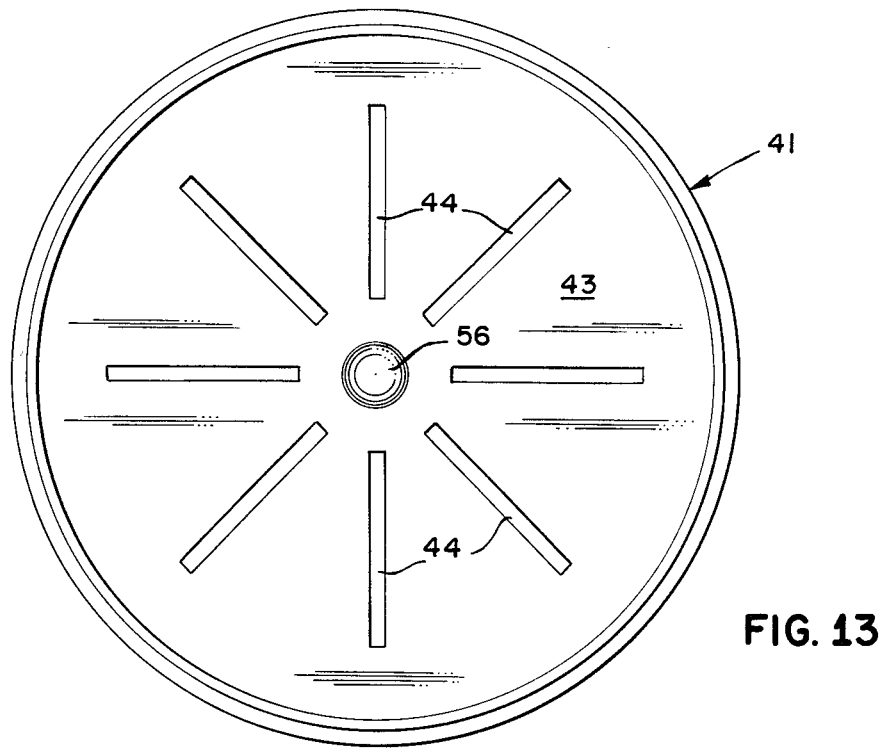
FIG. 13 is a bottom plan view of the inner pot as shown in FIG. 9 taken in the direction of lines 13—13.

The inner plant container is formed with an annular outwardly directed flange 52 and annular rim 50. The outer container is formed with an edge 53 dimensioned for registration with the flange 52 of the plant container. The edge 53 may be formed with openings for the free passage of air, but preferably flange 52 is formed with bridges 54 which rest on edge 53 and raise the plant container sufficiently to permit air to enter the space between the wall 72 of the outer container and wall 42 of the inner plant pot. Referring to FIG. 10, the inner plant container and outer container are dimensioned so that the cubic volume of the inner plant container is only slightly less than the volume of the outer container. This careful dimensioning prevents overfilling of the outer container and consequent overwatering since filling water above fill line will immediately cause spilling of water during the filling operation.

The water level, of course, begins to drop as soon as the inner plant container is placed in the outer container through adsorption of the water in the perlite and soil as well as by the withdrawal of water by the plant roots and evaporation of water from the soil. The separation of the containers is designed so that when the outer container is filled with water to the fill line, the water level will drop within a few hours below the bottom wall 43 of the inner pot. Thus, the device is similar to a natural plant environment in which the roots of the plant will be drained within a few hours of a soaking rain.

Figure 16:
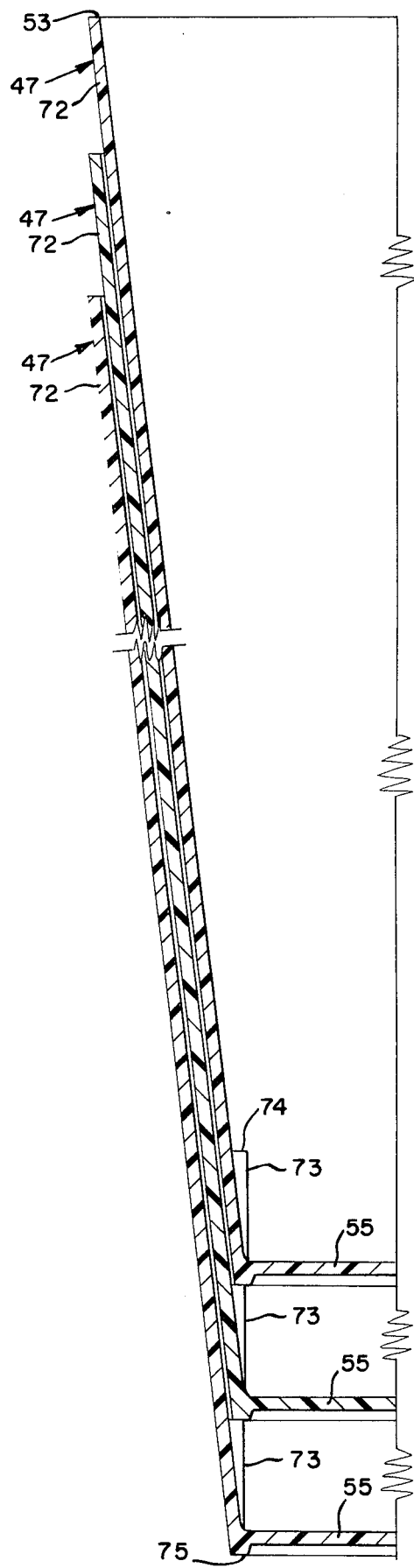
FIG. 16 is an enlarged cross section of a plurality of portions of outer pots of the type shown in FIG. 9 and stacked one above the other to illustrate their nesting capability for storage and transport.

A plurality of spaced wedge portions 73 of the sidewall of the outer container adjacent the bottom wall provide self registering of the inner container with the outer container. As shown in FIG. 16 drawings, this wedge portion preferably has a horizontal shoulder 74 for receiving the lower annular edge 75 of an adjacent stacked outer container.

Figure 15:
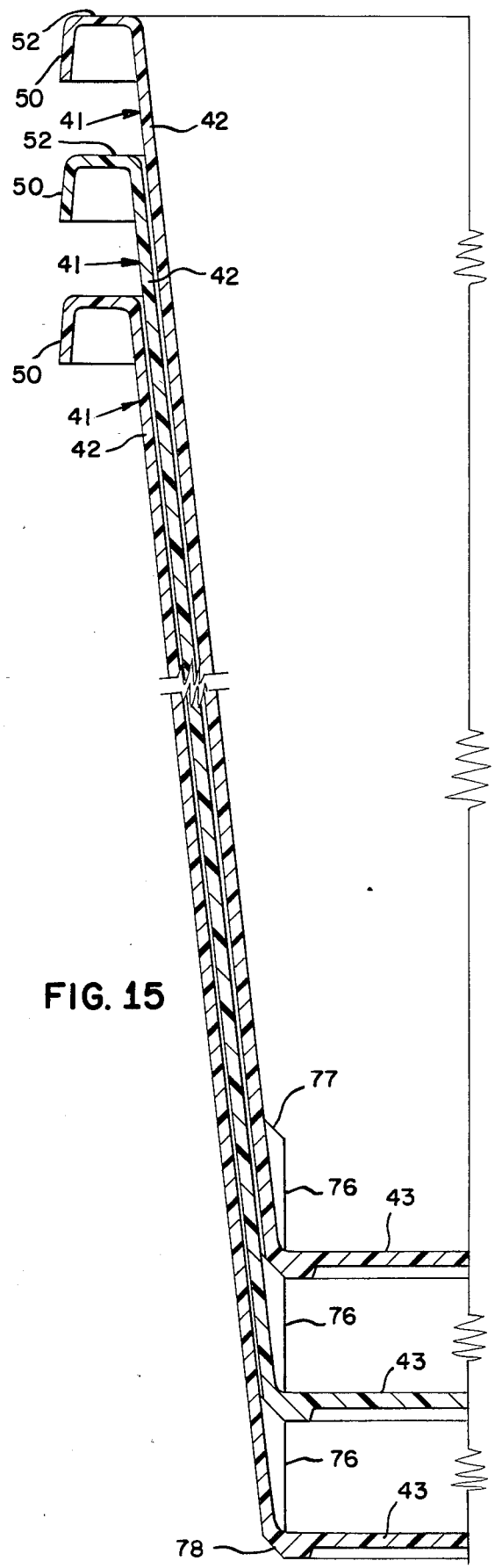
FIG. 15 is an enlarged cross section of a plurality of portions of inner pots of the type shown in FIG. 9 and stacked one above the other to illustrate their nesting capability for storage and transport.

Similarly inner container 41 is formed with a plurality of spaced wedges 76 located adjacent bottom wall 43 which have a downwardly sloping top edge 77 so that when stacked as shown in FIG. 15, the beveled annular edge 78 of the inner pot will rest on sloping top edge 77.

Bridge 54 in the inner container is located with respect to the bottom wall 43 of the inner container so that when the inner container is seated in registration with the outer container, the bottom wall 43 of the inner plant container is located in adjacent, spaced relation to the bottom wall 55 or the outer container. The bottom wall of the inner plant container, of course, should not contact the bottom wall 55 of the indent 56. Thus, the inner plant container is preferably supported on the bridges 54 and the edge 53 of the outer container.

The inner plant container 41 is dimensioned so that it suitably holds a particular species of a plant. The flange 52 of the inner plant pot is formed with a wide surface which is formed without sharp edges. This is important for plants such as violets which have tender plant stems and could be damaged by contact with the sharp edges of an incorrectly formed plant pot rim.

The annular rim 50 extends below bridge 54 and edge 53 of the inner container. This gives a more pleasing appearance. The rim also ensures that the inner plant container is properly seated on the edge of the outer container. The bottom wall 43 of the inner plant container is preferably flat. Openings 44 in the bottom wall may be of any shape, and size is dependent primarily on the size of the non-soil material to be contained. The most inexpensive form of opening is an elongated slot, radiating from a central portion of the bottom wall.

The openings 46 as shown in FIG. 10 are preferably slits which extend up a preselected distance in the sidewall. The upper ends 57 of slits 46 should be located below the level of the soil and well above the highest upper level of water when the reservoir container is initially filled. The tops of the slits should be above water line so that air may pass through the slots 46 and the perlite material to the roots during substantially all of the growing time of the plant.

The outer container 47 is preferably formed with a depending annular lower edge 75 so that the bottom wall 55 will not rest on the supporting surface such as a table top thereby resulting in an unstable condition. The sidewalls 72 of the outer container are preferably tapered for appearance and for ease of manufacture. Tapering the sidewalls 42 and 72 of the inner container 41 and outer container 47 also enables the inner and outer containers to be nested as shown in FIGS. 15 and 16 and placed in a small space for storage and shipping. Note that the inner and outer containers may be dimensioned so that the height of both stacks is substantially equal.

OPERATION OF THE PREFERRED FORM OF THE INVENTION

Perlite or other inert non-soil material should first be placed in the inner container to a depth indicated by the fill line 49. Soil and the plant should then be placed in the container. Since all watering is from below, the soil may be placed quite close to the top flange 52 of the container. Normally the soil would have to be well below the rim of the container to permit a quantity of water to be poured into the top of the container without spillage while the water percolated down into the soil. The initial watering may be done from above, depending on the needs of the particular plant and then soil filled to nearly the top of the container.

Water is then poured into the reservoir container to the indexing mark 51. Finally, the plant container is set into the reservoir container.

Initially, the inner container will float, but the perlite quickly adsorbs a portion of the water and water begins to work its way up into the soil of the container by the normal manner in which water rises in dry soil. Since the openings are distributed over the entire bottom 43 and the openings 46 extend up the sidewalls, the water is quickly adsorbed by the perlite and soil and creates a substantial moistened zone in the soil into which the roots penetrate. This large moistened zone, provides moisture throughout the entire plant pot rather than in just a small area so that the roots will spread evenly throughout the inner pot rather than growing toward a small moist zone. The perlite adsorbs the water quickly and the water level drops below the bottom wall of the inner plant container within a few hours.

The outer container must be replenished with water periodically and the time period will depend upon the size and type of plant, humidity of the atmosphere in which the plant is growing, amount of direct sunlight which reaches the plant and the environment temperature. The plant and moisture in the soil should be checked frequently until a time period is established for refilling the outer container. Refilling is determined by touching the soil and determining whether the soil has a moist or dry feel. Water should not be added too frequently. The water should be permitted to drain and the water level permitted to remain below the bottom wall of the plant at substantially all times.

The key to the operation of the form of the invention illustrated in FIGS. 9-14 is that the space between the inner and outer containers provides minimal space for the storage of water. Thus, when a measured amount of water is placed in the bottom of the outer container, and the inner container is placed in the outer container, the water is forced through the openings in the inner container into the perlite. The water is adsorbed by the perlite and works its way up to the soil. The interface between soil and perlite is co-extensive. Thus, the entire bottom of the soil is wetted. Within hours substantially the entire water supply is held in the inner container. At all times, air can enter the inner container through slots 46. Within a few hours, the water level falls below the bottom of the inner container and air can reach the perlite through bottom openings 44. An exchange of air can take place at all times between the inner and outer containers due to the bridges 54 causing a gap between edge 53 of the outer container and flange 52 of the inner container.

A plurality of guides 79 are formed in the upper outer wall of the inner container. The bottom portion of the guide is formed with a taper 80. An addition to serving as a guide, the guide members 79 center the inner pot within the outer pot to insure that air can circulate freely to the slots in the inner container.

Even though the perlite is saturated, air can easily pass up through the perlite to the plant roots.

I claim:

1. A plant pot for holding a living plant and soil comprising:
   a. an open topped inner plant container formed from an impermeable material having outwardly and upwardly extending sidewalls terminating in a top edge and formed with an outwardly extending flange disposed closer to the top of said inner plant container than the bottom of said inner plant container for containing said plant, non-soil, and soil and a right angularly related generally planar bottom wall formed with a plurality of openings generally distributed over substantially said entire bottom wall permitting the free passage of air and water, and said bottom wall having an area substantially as great as the area of said open top;
   b. an outer container formed from an impermeable material and formed with a generally planar bottom wall and having outwardly and upstanding sidewalls terminating in a rim adjacent and below said annular flange for enveloping substantially the entire portion of said inner plant container and said sidewall is marked with a fill level mark for water;
   c. air admissions means located adjacent said upper portion of said outer container permitting the continuous exchange of air to and from said lower portion of said inner plant container;
   d. a quantity of non-soil water absorbing filler material filling said bottom portion of said inner plant container to a selected fill level and permitting the passage of air and water and generally supporting and preventing the passage of said soil material;
   e. said volumes of said inner and outer containers are selected and said water fill level mark is selected so that the initial water supply will be absorbed by said non-soil filler material and upon adsorption, the level of said water will fall below the level of the bottom wall of the inner container;
   f. said inner and outer sidewalls of said containers are substantially coterminus but spaced to provide space for the passage of air;
   g. said sidewalls of said inner and outer containers are positioned at substantially the same angle with respect to their respective bottom walls so that said inner container will nest within said outer container, said inner container will nest within a plurality of said inner containers and said outer containers will nest within a plurality of said outer containers; and
   h. elevating means raising said bottom wall of said inner container above the bottom wall of said outer container a selected distance.

2. A plant pot as described in claim 1 comprising:
   a. said non-soil fill material is expanded perlite;
   b. all walls of said plat pot have a uniform thickness; and
   c. said flange of said inner container is located at said top edge.

3. A plant pot as described in claim 1 comprising:
   a. a line formed in said inner plant container indicating said pre-selected fill line for said non-soil material; and
   b. said sidewall of said inner container is formed with a plurality of air and water openings located below said non-soil fill level.

4. A plant pot as described in claim 1 comprising:
   a. a plurality of inwardly projecting wedge members formed on the inner side of said sidewalls of said inner plant container adjacent said bottom wall adapted for recieving the bottom edge of a bottom wall of a like inner plant container in a stacking mode.

5. A plant pot as described in claim 1 wherein:

a. said air admissions means includes a plurality of spaced bridge members formed in said flange of said inner plant container; and b. said outer container is formed with an edge dimensioned for registration with said bridge members of said inner container, and the space formed therebetween provides for the continuous free passage of air.

6. A plant pot as described in claim 1 comprising:

a. said inner wall of said outer container is formed with a plurality of annularly spaced inwardly projecting wedges formed with a horizontal shoulder adapted for receiving a lower edge of a bottom wall of a like outer container in a stacking mode.

7. A plant pot as described in claim 1 wherein:

a. said height of said inner and outer containers are substantially equal so that a plurality of nested inner containers will substantially equal the height of a plurality of nested outer containers.

* * * * *